M. O'BANNON.
CORN THINNER.
APPLICATION FILED APR. 23, 1912.

1,044,806.

Patented Nov. 19, 1912.

Witnesses
J. C. Simpson

Inventor
M. O'Bannon
By
Attorneys

UNITED STATES PATENT OFFICE.

MAURICE O'BANNON, OF GLENARM, KENTUCKY.

CORN-THINNER.

1,044,806.

Specification of Letters Patent.

Patented Nov. 19, 1912.

Application filed April 23, 1912. Serial No. 692,701.

*To all whom it may concern:*

Be it known that I, MAURICE O'BANNON, a citizen of the United States, residing at Glenarm, in the county of Oldham, State of Kentucky, have invented certain new and useful Improvements in Corn-Thinners; and I do hereby declare the following to be a full, clear, and exact description of the invention, such as will enable others skilled in the art to which it appertains to make and use the same.

This invention relates to improvements in devices for thinning growing corn, and has for its object to construct a device of this character, which is simple in construction, efficient in operation and having combined therewith means for scraping the jaws to remove damp soil therefrom.

With these and other objects in view, this invention resides in the novel features of construction, formations, combinations and arrangements of parts to be hereinafter more fully described, claimed and illustrated in the accompanying drawing, in which:—

Figure 1:
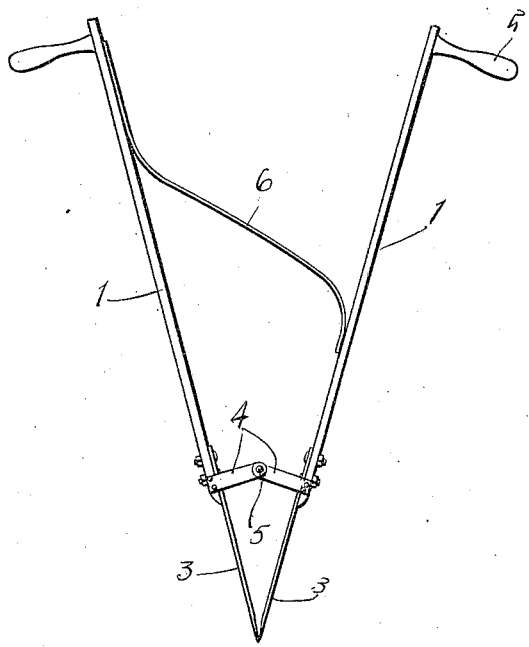
Figure 2:
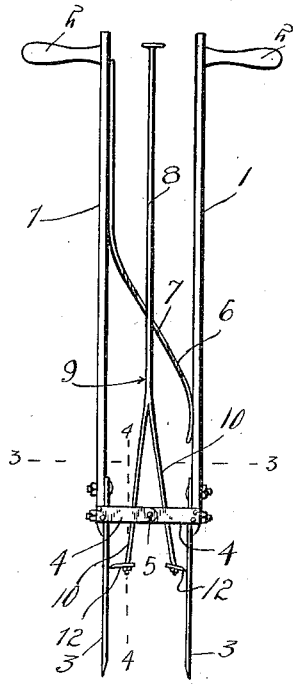
Figure 3:
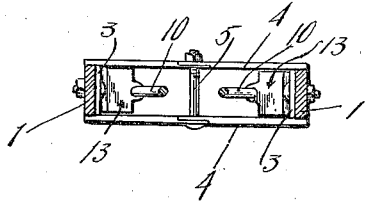
Figure 4:
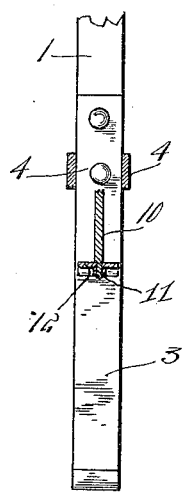

Figure 1 is a side elevation of the device. Fig. 2 is a similar view showing the jaw scraper applied. Fig. 3 is a sectional view on line 3—3 of Fig. 2. Fig. 4 is a sectional view on line 4—4 of Fig. 2.

Referring to the drawing, the numeral 1 designates the handles, a pair of which are employed, and have secured to their upper ends grips 2.

Bolted to the lower ends of the handles 1 are metal jaws 3 which are spanned by the outer ends of plates 4, which are arranged in spaced relation and secured to the lower ends of the handles 1, the inner ends of the straps being pivotally connected by the bolt 5. The jaws 3 are held in contact at their lower ends by a leaf spring 6 one end of which is secured to the inner face of one of the handles 1, while the other end thereof bears against the opposite handle, thus normally holding the jaws in a clamped position.

Formed intermediate the spring 6 is a slot 7, through which the handle 8 of the scraper 9 passes. Formed upon the lower end of the handle 8 are resilient arms 10, said arms being permitted to move vertically between the plates 4. The lower ends of the arms 10 are formed with threaded extensions 11, and engaging said extensions are the scraper blades 12 which are held in yielding contact with the inner surfaces of the jaws 3, owing to the fact that the arms 10 are formed from resilient metal. It will be of course understood that the tension of the spring 6 is sufficient to overcome the tension of the arms 10, thus permitting the jaws 3 to be normally closed. By detachably connecting the scraper blades 12 to the arms 10, it is obvious that upon removal of said blades the scraper may be readily removed and replaced, as the occasion may require.

The operation of the device is as follows:—The handles 1 are forced toward each other, thus spreading the jaws 3 whereupon said jaws are placed so as to span a plant, and upon the pressure being released from said handles, the jaws are drawn together by the spring 6, and with the assistance of the operator the plant and roots may be readily removed. When thinning corn in damp weather the dirt will accumulate upon the jaws 3, thus retarding the insertion of said jaws into the earth, therefore to remove the dirt, the scraper 9 is provided.

What I claim is:—

In a device of the class described comprising a pair of handles, jaws secured to the lower ends of said handles, plates carried by the handles and having their inner ends pivotally connected, a leaf spring having one end secured to one of the handles and having its other end bearing against the other handle, a slot formed in said spring, a scraper comprising a handle adapted to pass through the slot of the spring, resilient arms formed upon the lower end of the handle and passing between the plates, blades carried upon the lower ends of the arms and adapted to yieldably contact with said jaws, as and for the purposes set forth.

In testimony whereof, I affix my signature, in presence of two witnesses.

MAURICE O'BANNON.

Witnesses:
 NORVIL BROWN,
 FIELDING PRIEST.